United States Patent
Zhong et al.

(10) Patent No.: US 9,465,424 B2
(45) Date of Patent: Oct. 11, 2016

(54) POWER SAVING DURING A CONNECTION DETECTION

(71) Applicant: QUALCOMM Incorporated, San Diego, CA (US)

(72) Inventors: Cheng Zhong, San Diego, CA (US); Nam Van Dang, San Diego, CA (US); Hung Q. Vuong, San Diego, CA (US); Xiaohua Kong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 14/167,000

(22) Filed: Jan. 29, 2014

(65) Prior Publication Data
US 2014/0149756 A1    May 29, 2014

Related U.S. Application Data

(62) Division of application No. 12/575,498, filed on Oct. 8, 2009, now Pat. No. 8,674,679.

(51) Int. Cl.
G06F 1/26    (2006.01)
G06F 1/16    (2006.01)
G06F 1/32    (2006.01)

(52) U.S. Cl.
CPC ............. G06F 1/266 (2013.01); G06F 1/1632 (2013.01); G06F 1/3203 (2013.01); Y10T 307/76 (2015.04)

(58) Field of Classification Search
CPC ..... G06F 1/3203; G06F 1/266; G06F 1/1632
USPC .................................................... 324/76.11
See application file for complete search history.

(56) References Cited

U.S. PATENT DOCUMENTS

2008/0012983 A1    1/2008 Oshima
2008/0129883 A1    6/2008 Hirai et al.
2008/0152023 A1    6/2008 Yoshida et al.
(Continued)

FOREIGN PATENT DOCUMENTS

CN    101248665 A    8/2008
CN    100479506 C    4/2009
(Continued)

OTHER PUBLICATIONS

International Search Report and Written Opinion—PCT/US2010/051863, International Search Authority—European Patent Office—Mar. 11, 2011.
(Continued)

*Primary Examiner* — Thomas F Valone
(74) *Attorney, Agent, or Firm* — Alan Gordon; Kenneth Vu

(57) ABSTRACT

In a particular embodiment, an electronic device includes a direct current (DC) voltage source coupled to a DC interface. The electronic device includes a receiver sense circuit configured to detect a connection of the electronic device to a sink device via a connector without consuming power from the DC voltage source. The electronic device further includes a controller coupled to a hot plug detect (HPD) interface. The controller is configured to receive a detection signal from the receiver sense circuit, selectively control a switch to enable and disable the DC voltage source based on the detection signal, detect an HPD signal at the HPD interface after enabling the DC voltage source, and disable the receiver sense circuit in response to detecting the HPD signal.

24 Claims, 6 Drawing Sheets

(56) References Cited

U.S. PATENT DOCUMENTS

2008/0232209 A1  9/2008  Vergoossen et al.
2009/0237561 A1  9/2009  Kobayashi
2011/0084685 A1  4/2011  Zhong et al.

FOREIGN PATENT DOCUMENTS

| JP | 2003086233 A | 3/2003 |
| --- | --- | --- |
| JP | 2006311223 A | 11/2006 |
| JP | 2007274065 A | 10/2007 |
| JP | 2007536673 A | 12/2007 |
| JP | 2009506615 A | 2/2009 |
| WO | 2005111796 A2 | 11/2005 |
| WO | 2007049556 A1 | 5/2007 |

OTHER PUBLICATIONS

Sonnet User's Guide, Apr. 2009, pp. 16-17, Sonnet Software, Retreived from the internet: URL<http://www.sonnetsoftware.com/support/downloads/manuals_v12/guide.pdf>.

Taiwan Search Report—TW099134526—TIPO Aug. 14, 2013.

Yoshinori, JP2007-274065, JPO machine translation, p. 1-30.

US 9,465,424 B2

POWER SAVING DURING A CONNECTION DETECTION

I. CLAIM OF PRIORITY

The present application claims priority from and is a divisional of U.S. patent application Ser. No. 12/575,498, filed Oct. 8, 2009, entitled "POWER SAVING DURING A CONNECTION DETECTION," the content of which is incorporated by reference herein in its entirety.

II. FIELD

The present disclosure is generally related to power saving for hot plug detect.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless telephones may also include multimedia capabilities such as audio and/or video (A/V) input and AN output. Popular A/V interfaces for standalone devices such as digital versatile disk (DVD) players and blu-ray disk (BD) players include high definition video interface (HDMI) and digital visual interface (DVI). One consideration in incorporating these interfaces into wireless telephones is power consumption required by the interfaces. For example, the HDMI and DVI specifications require that devices support hot plug detect (HPD), a feature that enables detection of a connection to another HDMI or DVI compatible device. The HDMI and DVI specifications further require that to support HPD, devices include a +5 volt direct current (DC) power source that remains active. However, maintaining the +5V DC power source may shorten the battery life of wireless telephones that attempt to incorporate HDMI or DVI.

IV. SUMMARY

Systems and methods of power saving for hot plug detect are disclosed. A receiver sense circuit and a controller are added to a source device (e.g., an HDMI-enabled wireless telephone). When enabled, the receiver sense circuit detects a connection of a sink device (e.g., an HDTV-compatible display device) to the source device via a connector (e.g., an HDMI cable) via pins (e.g., HDMI Clock pins or HDMI Red, Green, or Blue Data pins) of the connector. When the receiver sense circuit detects the connection, the controller activates a DC voltage source at the source device and receives an HPD signal. In response to receiving the HPD signal, the controller disables the receiver sense circuit and enables multimedia output via an output driver of the source device. When the connector is disconnected from either the source device or the sink device, the controller detects an absence of the HPD signal. In response, the controller disables the DC voltage source.

In a particular embodiment, a method is disclosed that includes detecting, at a source device connectable to a sink device, a connection of the source device to the sink device via a connector. The source device includes a DC voltage source and the connection is detected without consuming power from the DC voltage source.

In another particular embodiment, an electronic device includes a DC voltage source coupled to a DC interface. The electronic device also includes a receiver sense circuit configured to detect a connection of the electronic device to a sink device via a connector without consuming power from the DC voltage source. The electronic device further includes a controller coupled to a HPD interface. The controller is configured to receive a detection signal from the receiver sense circuit. The controller is also configured to selectively control a switch to enable or disable the DC voltage source based on the detection signal. The controller is further configured to detect an HPD signal at the HPD interface after enabling the DC voltage source and to disable the receiver sense circuit in response to detecting the HPD signal. The controller is configured to detect an absence of the HPD signal and to enable the receiver sense circuit in response to detecting the absence of the HPD signal.

One particular advantage provided by at least one of the disclosed embodiments is an ability to support HPD without continuously draining a battery due to a bias current of a +5V DC power source. Another particular advantage provided by at least one of the disclosed embodiments is an elimination of a battery-draining bias current in a device supporting HPD when the device is in an idle state, a standby state, a non high definition (HD) output state, or other state in which an HDMI interface is inactive.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
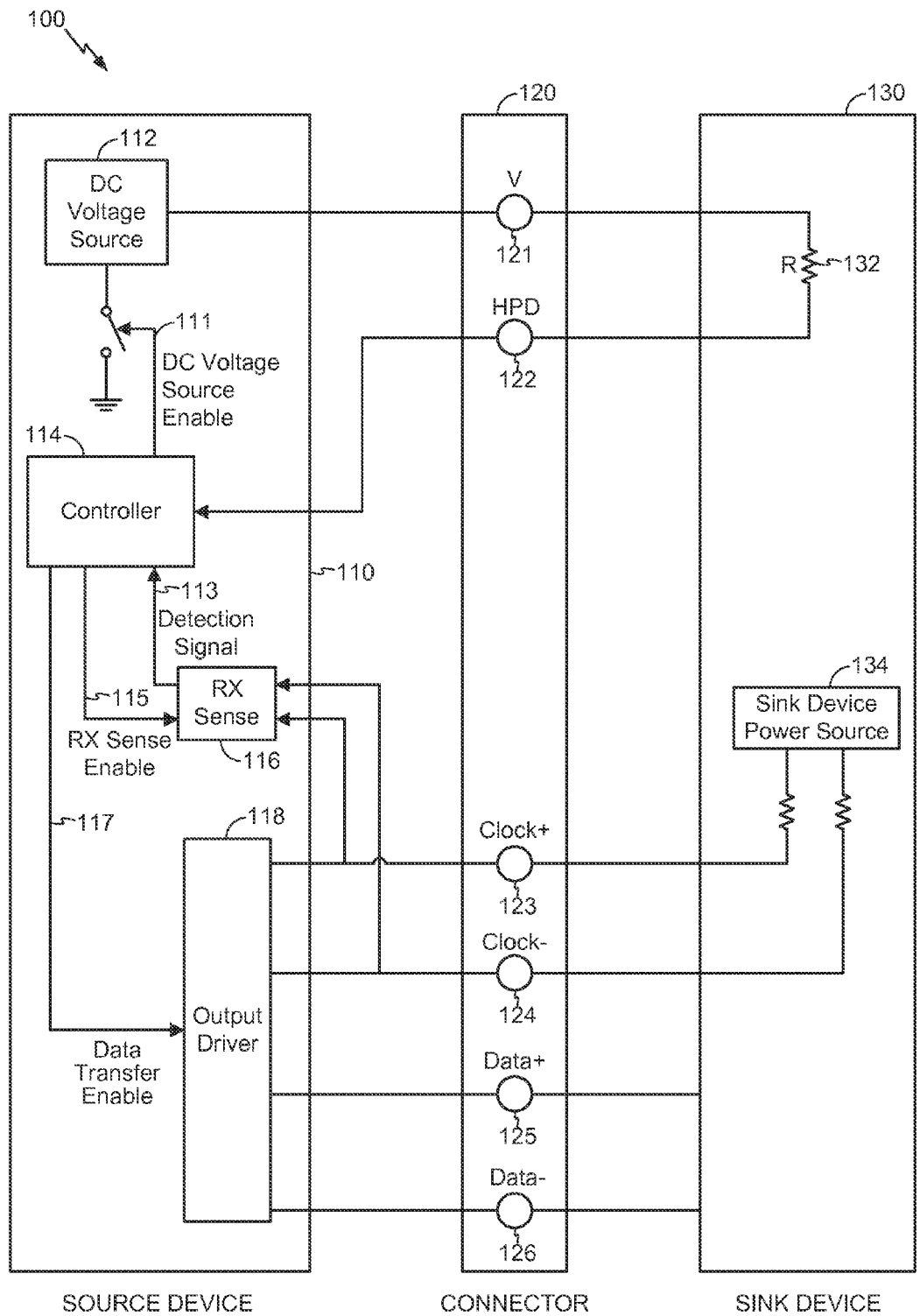
FIG. 1 is a block diagram of a particular illustrative embodiment of a system of power saving for HPD.

Referring to FIG. 1, a particular illustrative embodiment of a system of power saving for hot plug detect (HPD) is disclosed and generally designated 100. The system includes a source device 110 connected to a sink device 130 via a connector 120. In an illustrative embodiment, the connector 120 is a high definition multimedia interface (HDMI) cable or a digital visual interface (DVI) cable.

The source device 110 includes a DC voltage source 112 coupled to a voltage supply pin 121 of the connector. In a particular embodiment, the DC voltage source 112 produces a DC voltage of about 5 volts. For example, the connector 120 may be an HDMI cable and the DC voltage source 112 may be coupled to pin eighteen of the HDMI cable (designated as a +5V power pin by the HDMI specification). As another example, the connector 120 may be a DVI cable and the DC voltage source 112 may be coupled to pin fourteen of the DVI cable (designated as a +5V power pin by the DVI specification). The HDMI specification may be found at www.hdmi.org and the DVI specification may be found at www.ddwg.org.

The source device 110 also includes a controller 114 coupled to an HPD pin 122 of the connector 120. For example, the connector 120 may be an HDMI cable and the controller 114 may be coupled to pin nineteen of the HDMI cable (designated as an HPD pin by the HDMI specification). As another example, the connector 120 may be a DVI cable and the controller may be coupled to pin sixteen of the DVI cable (designated as an HPD pin by the DVI specification). The controller 114 is configured to selectively switch on and switch off the DC voltage source 112 via a DC voltage source enable signal 111 in response to a detection signal 113 received from a receiver (RX) sense circuit 116. For example, the controller 114 may control a switch that enables or disables a connection to the DC voltage source 112. The controller is also configured to selectively enable and disable the RX sense circuit 116 via an RX sense enable signal 115 in response to an HPD signal received from the HPD pin 122. The controller 114 is further configured to enable data transfer from an output driver 118 of the source device 110 via a data transfer enable signal 117 in response to detecting the HPD signal from the HPD pin 122.

The source device 110 further includes the RX sense circuit 116 that is configured to detect a connection between the source device 110 and the sink device 130 via the connector 120. The RX sense circuit 116 detects the connection without consuming power from the DC voltage source 112. In a particular embodiment, the RX sense circuit 116 detects the connection based on signals received from a Clock+ pin 123 and a Clock− pin 124 of the connector 120. For example, the connector 120 may be an HDMI cable and the RX sense circuit 116 may detect the connection based on signals received from pin 10 (designated by the HDMI specification as a transition minimized differential signaling (TMDS) Clock+ pin) and pin 12 (designated by the HDMI specification as a TMDS Clock− pin). As another example, the connector 120 may be a DVI cable and the RX sense circuit 116 may detect the connection based on signals received from pin 23 (designated by the DVI specification as a TMDS Clock+ pin) and pin 24 (designated by the DVI specification as a TMDS Clock− pin).

It should be noted that although the particular embodiment illustrated in FIG. 1 depicts the RX sense circuit 116 coupled to the clock pins 123-124, the RX sense circuit 116 may alternately be coupled to, and detect the connection via, a Data+ pin 125 and a Data− pin 126. For example, the data pins 125-126 may be TMDS Red Data+/− pins (pins 1/3 of an HDMI cable or pins 2/1 or 5/4 of a DVI cable), TMDS Green Data+/− pins (pins 4/6 of an HDMI cable or pins 10/9 or 13/12 of a DVI cable), or TMDS Blue Data+/− pins (pins 7/9 of an HDMI cable or pins 18/17 or 21/20 of a DVI cable).

The RX sense circuit 116 is configured to transmit the detection signal 113 to the controller 114 indicating whether or not the connection between the source device 110 and the sink device 130 via the connector 120 is detected. The RX sense circuit 116 is also configured to be selectively enabled and disabled by the controller 114 via the RX sense enable signal 115.

The output driver 118 at the source device 110 may be selectively enabled and disabled by the controller 114 via the data transfer enable signal 117. In an illustrative embodiment, the output driver 118, when enabled, outputs a video signal from the source device 110 to the sink device 130 via data pins (e.g., the Data+ pin 125 and the Data− pin 126) of the connector. For example, the output driver 118 may transmit HD video to the sink device 130 via the data pins 125-126.

Although the connector 120 is illustrated in FIG. 1 as having only six pins 121-126, the connector 120 may have any number of pins. For example, when the connector 120 is an HDMI cable, the connector 120 may have at least nineteen pins. As another example, when the connector 120 is a DVI cable, the connector 120 may have as many as twenty-four digital pins and five analog pins.

The sink device 130 includes a resistor R 132 and a sink device power source 134. In a particular embodiment, the resistor R 132 is a 1 kΩ resistor that loops a signal received from a voltage supply pin 121 of the connector 120 to the HPD pin 122 of the connector 120. Thus, when the DC voltage source 112 at the source device 110 is active, a +5V signal is received at the resistor R 132 and transmitted back to the controller 114 via the HPD pin 122 of the connector 120 as the HPD signal. Thus, the sink device 130 may include a circuit to transmit the HPD signal to the source device 110 in response to receiving the +5V DC voltage from the source device 110. In a particular embodiment, the sink device power source 134 is a 3.3V power source connected to the clock+ pin 123 and to the clock− pin 124 of the connector 120 via two 50Ω resistors 136 and 138, respectively. Thus, when the source device 110 is connected to the sink device 130 via the connector 120, the RX sense circuit 116 may receive a signal via the clock+ pin 123 and the clock− pin 124 of the connector 120 even when the DC voltage source 112 is switched off and no HPD signal is received at the controller 114.

In operation, the source device 110 may implement power saving for HPD as follows. Initially, the source device 110 and the sink device 130 may be disconnected, the DC voltage source 112 may be switched off, and the RX sense circuit 116 may be enabled. Alternately, the RX sense circuit 116 may initially be disabled and selectively enabled by the controller 114 in response to an activation of an application that uses the high definition output capability of the output driver 118 (e.g. an HDTV application). Once the devices 110, 130 are connected via the connector 120 (e.g., an HDMI cable or a DVI cable), the RX sense circuit 116 may detect the connection between the devices 110, 130 via the connector 120 based on signals received from the clock pins 123-124 or the data pins 125-126 of the connector 120. It should be noted that when the RX sense circuit 116 detects the connection, the DC voltage source 112 is still switched off. Upon detecting the connection, the RX sense circuit 116 may notify the controller 114 of the detected connection via the detection signal 113.

In response, the controller 114 may enable the DC voltage source 112 coupled to the voltage supply pin 121 of the connector 120 and receive an HPD signal from the HPD 122 pin of the connector 120. The controller 114 may also disable the RX sense circuit 116 via the RX sense enable signal 115 in an effort to save power, because the RX sense circuit 116 may not be needed once the HPD signal is received by the controller 114. In response to receiving the HPD signal, the controller 114 may also enable output at the output driver 118 via the data transfer enable 117 signal. The source device 110 (e.g., an HDMI-equipped or DVI-equipped wireless telephone) may then transmit A/V signals to the sink device 130 (e.g., an HDTV display) via the connector 120.

When the source device 110 and sink device 130 are no longer connected via the connector 120 (e.g., because the connector 120 has been "unplugged" from one of the devices 110, 130), the controller 114 no longer receives the HPD signal at the HPD pin 122 of the connector 120. In response to detecting the absence of the HPD signal, the controller 114 may return the source device 110 to the initial state. That is, the controller 114 may switch off the DC voltage source 112 via the signal 111, disable the output driver 118 via the signal 117, and re-enable the RX sense circuit 116 via the signal 115 so that the RX sense circuit 116 may detect a subsequent connection to the sink device 130 or some other sink device.

It should be noted that during normal operation of the source device 110 (i.e., when the output driver 118 outputs A/V signals), the RX sense circuit 116 is disabled. Thus, the RX sense circuit 116 may not consume power during normal operation of the source device 110. A small current (e.g., approximately 150 μA) may travel through the RX sense circuit 116 during a short time interval between the sink device 130 being connected and the controller 114 disabling the RX sense circuit 116 in response to detecting the presence of the HPD signal. It should also be noted that in a particular embodiment, the controller 114 may be implemented as software (e.g., firmware) at the source device 110 configured to receive, send, and process digital signals (e.g. the signals 111,113,115,117, the HPD signal, signals from the clock pins 23-124, and signals from the data pins 125-126).

It will be appreciated that the system 100 of FIG. 1 may support HPD as required by the HDMI and DVI specifications while reducing current drain from the DC voltage source at the source device. Therefore, the system 100 of FIG. 1 may reduce or eliminate the bias current of the DC voltage source when the source device is in an idle mode, a standby mode, a non-HD output mode, a power-saving state to conserve battery life, or any combination thereof. It will thus be appreciated that the system 100 of FIG. 1 may enable battery-life savings in portable devices such as wireless telephones.

Figure 2:
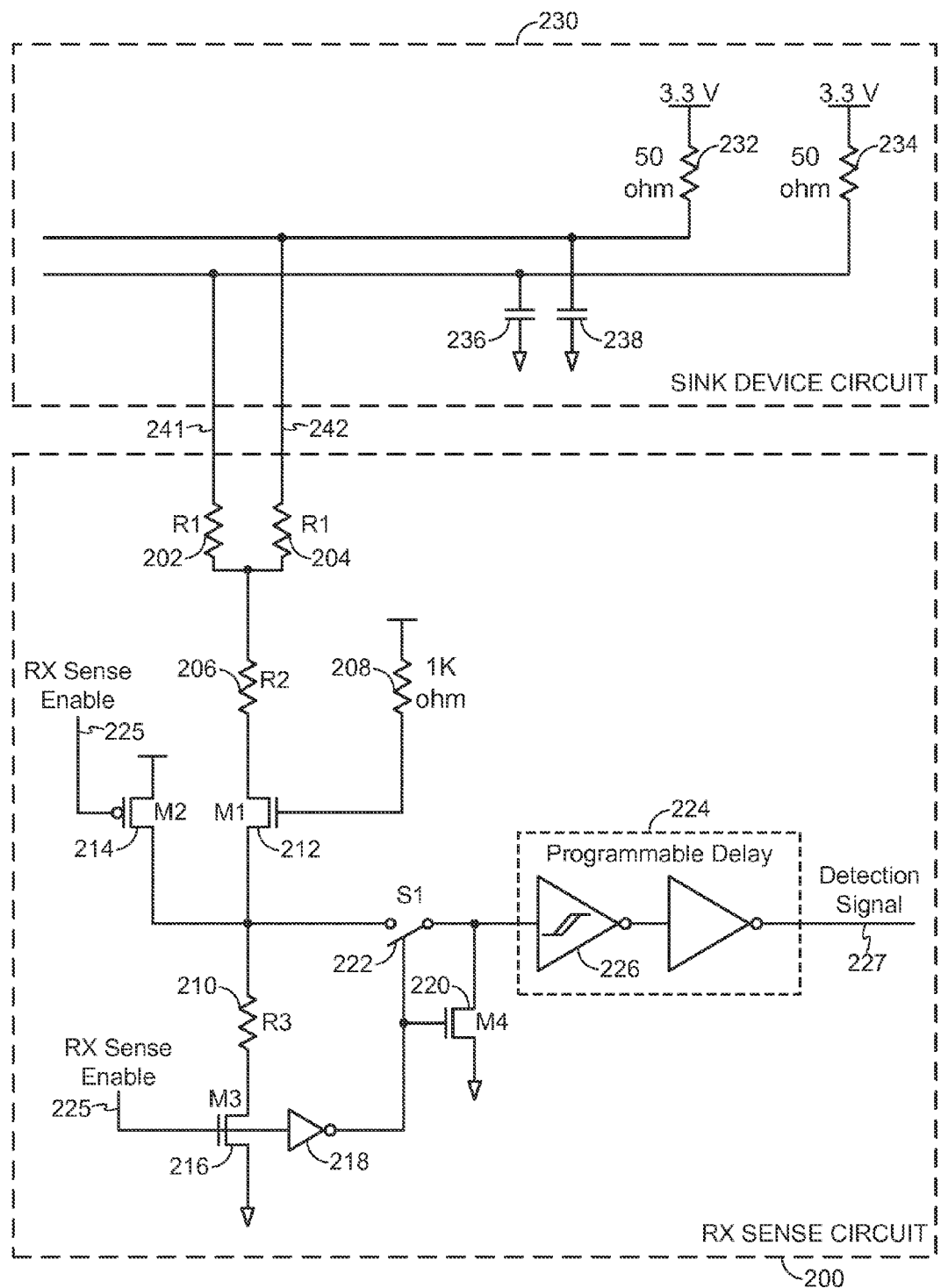
FIG. 2 is a circuit diagram of a particular illustrative embodiment of the receiver sense circuit of the system of FIG. 1.

Referring to FIG. 2, a circuit diagram of a particular illustrative embodiment of the RX sense circuit 116 of FIG. 1 is depicted and generally designated 200. The RX sense circuit 200 is coupled to a sink device circuit 230 and receives two signals 241-242 from the sink device circuit 230. In an illustrative embodiment, the sink device circuit 230 is a part of the sink device 130 of FIG. 1, and the signals 241-242 are received via a connector such as the connector 120 of FIG. 1.

The RX sense circuit 200 receives an RX sense enable signal 225 as a control signal to a PFET transistor M2 214 and to an NFET transistor M3 216. In an illustrative embodiment, the RX sense enable signal 225 is the RX sense enable signal 115 of FIG. 1 received from a controller such as the controller 114 of FIG. 1 (e.g., in response to an activation of an HDTV application). The RX sense circuit 200 also includes two resistors R1 202 and 204 that couple the signals 241-242 to a resistor R2 206. The resistor R2 206 is connected to the input of an NFET transistor M1 212 that receives a control signal via a 1 kΩ resistor 208. The outputs of the transistors M1 212 and M2 214 are applied to a resistor R3 210 that is connected to the input of an NFET transistor M3 216. The transistor M3 216 also receives the RX sense enable signal 225 as a control signal.

The outputs of the transistors M1 212 and M2 214 are also applied to a programmable delay circuit 224 and to an NFET transistor M4 220. A switch S1 222 controls the application of the output to both the programmable delay circuit 224 and to the transistor M4 220. The switch S1 222 is controlled by an inverse of the RX sense enable signal 225 (inverted by an inverter 218). The inverse of the RX sense enable signal 225 is also applied as a control signal to the transistor M4 220. The programmable delay circuit 224 outputs a detection signal 227 that indicates whether the either of signals 241,242 are active. In an illustrative embodiment, the detection signal 227 is the detection signal 113 of FIG. 1.

It should be noted that the programmable delay circuit 224 may include a Schmitt trigger 226. The Schmitt trigger 226 may be triggered after an initial settling time of the RX sense circuit 200, so that the detection signal 227 changes state after the sink device capacitors 236-238 have discharged. For example, when the sink device capacitors 236-238 are coupled to 3.3V power sources, the Schmitt trigger 226 may have a threshold value of approximately 2V.

It will be appreciated that the RX sense circuit 200 of FIG. 2 may enable an HDMI or DVI source device to detect a connection to an HDMI or DVI sink device without consuming power from a DC voltage source at the source device. For example, the RX sense circuit 200 of FIG. 2 may detect a connection to an HDMI or DVI sink device based on signals (e.g., the signals 241-242) received from the sink device. It will further be appreciated that the RX sense circuit 200 of FIG. 2 may be implemented by adding a few transistors, resistors, and inverters to a source device. It will thus be appreciated that an area penalty associated with the RX sense circuit 200 of FIG. 2 may be small relative to the area occupied by a source device.

Figure 3:
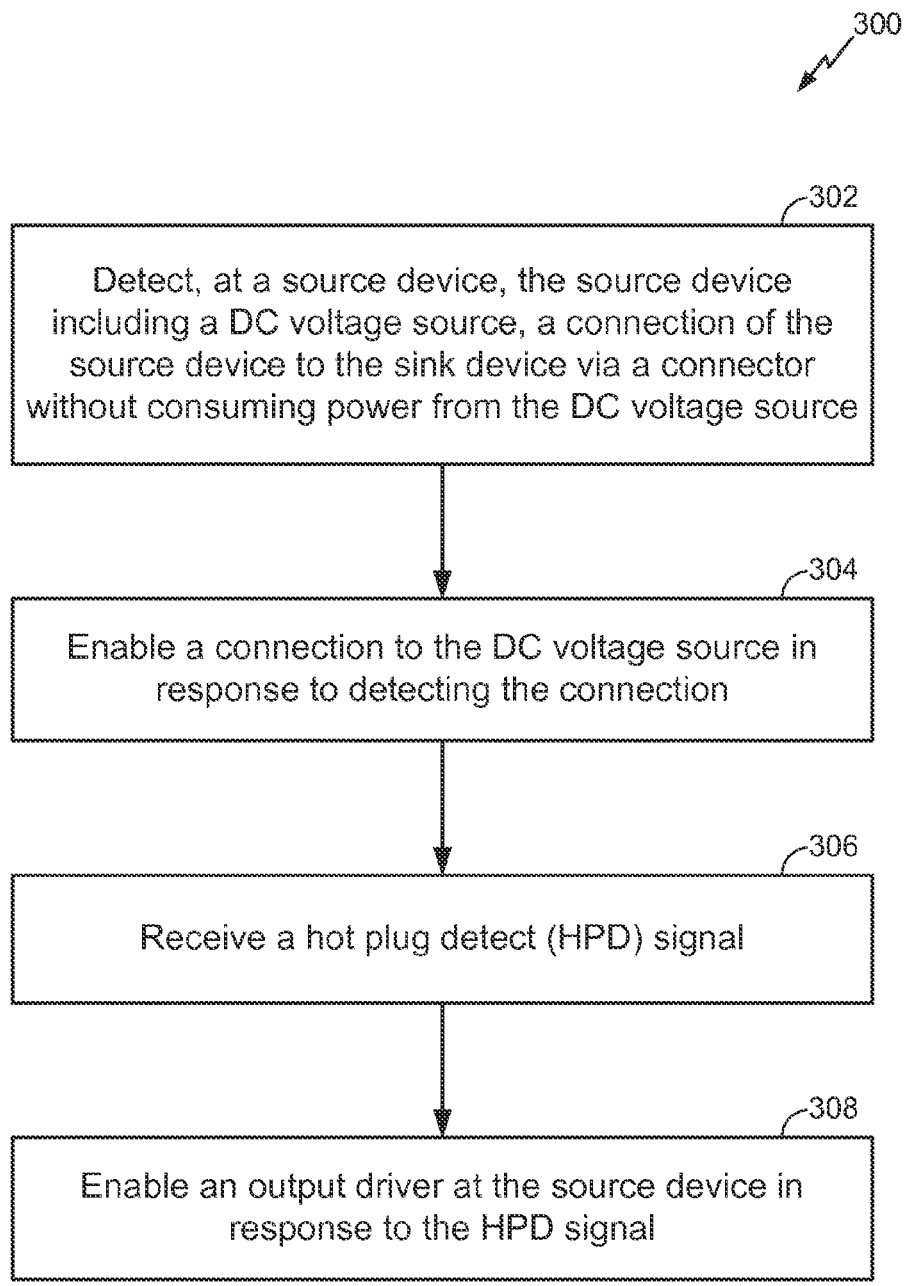
FIG. 3 is a flow diagram of a particular illustrative embodiment of a method of power saving for HPD.

Referring to FIG. 3, a flow diagram of a particular illustrative embodiment of a method of power saving for HPD is depicted and generally designated 300. In an illustrative embodiment, the method 300 may be performed by the source device 110 of FIG. 1.

The method 300 includes detecting, at a source device that includes a DC voltage source, a connection of the source device to the sink device via a connector, at 302. The connection is detected without consuming power from the DC voltage source. For example, FIG. 1 the RX sense circuit 116 may detect a connection of the source device 110 to the sink device 130 via the connector 120 without consuming power from the DC voltage source 112.

The method 300 also includes enabling a connection to the DC voltage source in response to detecting the connection, at 304. For example, in FIG. 1, the controller 114 may activate a switch coupled to the DC voltage source 112.

The method 300 further includes receiving an HPD signal, at 306. For example, in FIG. 1, the controller 114 may receive an HPD signal via the HPD pin 122 of the connector 120.

The method 300 includes enabling an output driver at the source device in response to detecting the HPD signal, at 308. For example, in FIG. 1, the controller 114 may enable the output driver 118 via the data transfer enable signal 117.

It will thus be appreciated that the method 300 of FIG. 3 may enable source devices (e.g., HDMI or DVI source devices) to detect a connection to a sink device (e.g., HDMI or DVI sink devices) without consuming power from a DC voltage source of the source device.

Figure 4:
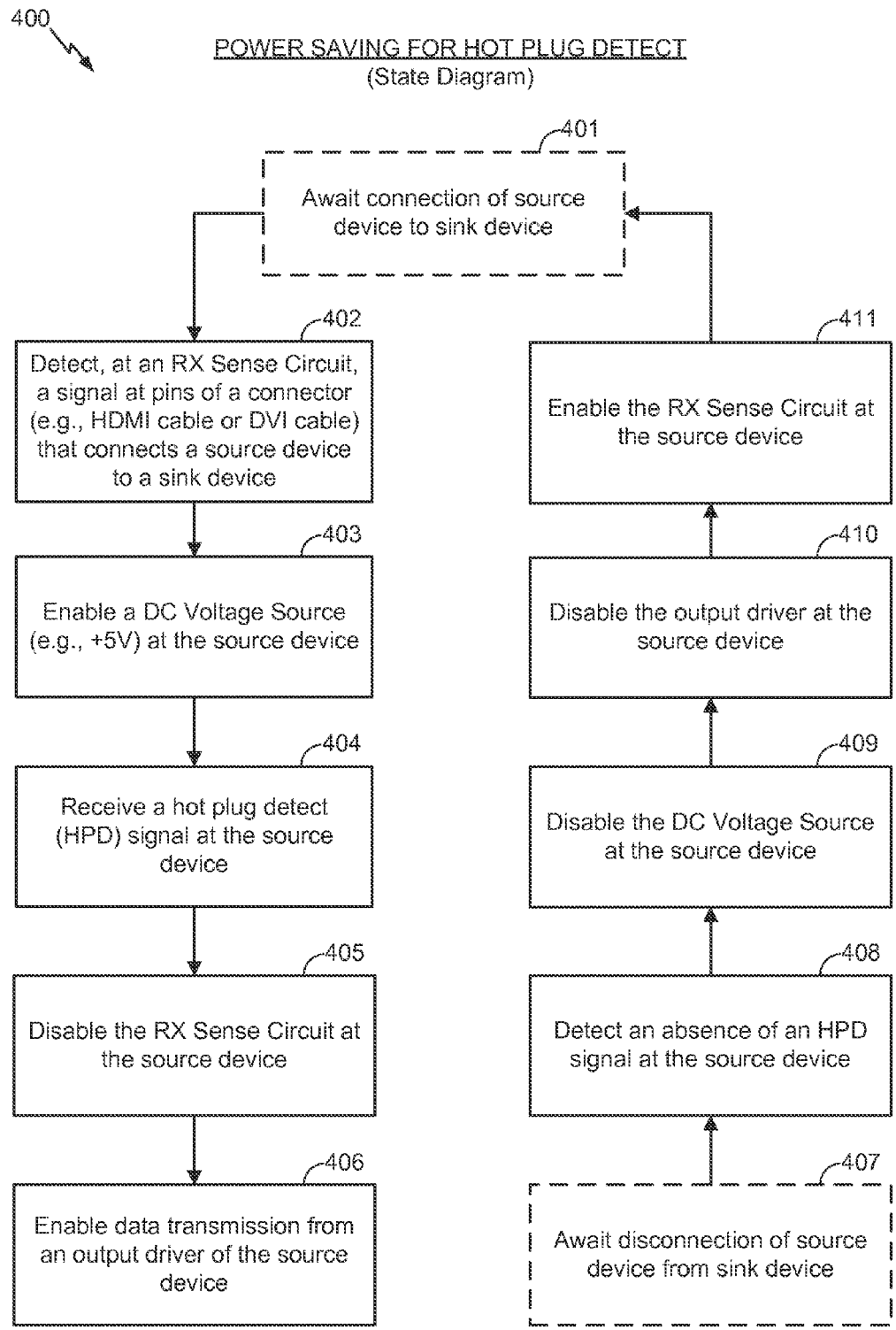
FIG. 4 is diagram to illustrate a particular illustrative embodiment of a state diagram to implement power saving for HPD at a source device.

Referring to FIG. 4, a particular illustrative embodiment of a state diagram to implement a power saving method for HPD at a source device is depicted and generally designated 400. It will be noted that the state diagram 400 is a one-way cyclical state diagram.

At state 401, the source device awaits a connection to a sink device. When the source device is connected to a sink device, an RX sense circuit at the source device detects the connection at pins of a connector, at state 402. For example, referring to FIG. 1, when the source device 110 is connected to the sink device 130, the RX sense circuit 116 may detect the connection via the signals sent over pins 123-124 of the connector 120.

When the connection is detected, a DC voltage source at the source device is enabled, at state 403. For example, referring to FIG. 1, when the RX sense circuit 116 detects the connection, the controller 114 may enable the DC voltage source 112.

After enabling the DC voltage source, an HPD signal may be received, at state 404. For example, referring to FIG. 1, after the controller 114 enables the DC voltage source 112, the controller 114 may receive an HPD signal via the HPD pin 22 of the connector 120.

Upon receiving the HPD signal, the RX sense circuit at the source device may be disabled, at state 405. For example, referring to FIG. 1, the controller 114 may disable the RX sense circuit 116 upon receiving the HPD signal.

After the RX sense circuit is disabled, data transmission from an output driver of the source device may be enabled, at state 406. For example, referring to FIG. 1, the controller 114 may enable data transmission from the output driver 118 after receiving the HPD signal.

Once the output driver is active, the source device enters a state 407, and awaits a disconnection of the source device from the sink device. When the source device is disconnected from the sink device, an absence of the HPD signal at the source device is detected, at state 408. For example, referring to FIG. 1, the controller 114 may detect an absence of the HPD signal at the HPD pin 122 of the connector. In an illustrative embodiment, the absence of the HPD signal is detected by a pull-down circuit of the controller 114 that is coupled to the HPD pin 122.

After detecting the absence of the HPD signal, the DC voltage source at the source device may be disabled, at state 409. For example, referring to FIG. 1, the controller 114 may disable the DC voltage source 112.

The output driver of the source device may also be disabled, at state 410. For example, referring to FIG. 1, the controller 114 may disable data transfer at the output driver 118.

After the output driver is disabled, the RX sense circuit at the source device is enabled, at state 411. For example, referring to FIG. 1, the controller may enable the RX sense circuit 116. Once the RX sense circuit is enabled, the source device returns to the state 401 and awaits another connection of the source device to the sink device. Alternately, the RX sense circuit at the source device may remain disabled until an activation of an application at the source device that uses HD output.

It should be noted that the state diagram 400 illustrated in FIG. 4 depicts an illustrative embodiment of a method of power saving for HPD. Thus, the order of various states may be interchanged while keeping power saving for HPD intact. For example, the order of the states 405-406 may be interchanged. As another example, the order of the states 409-411 may be interchanged.

Figure 5:
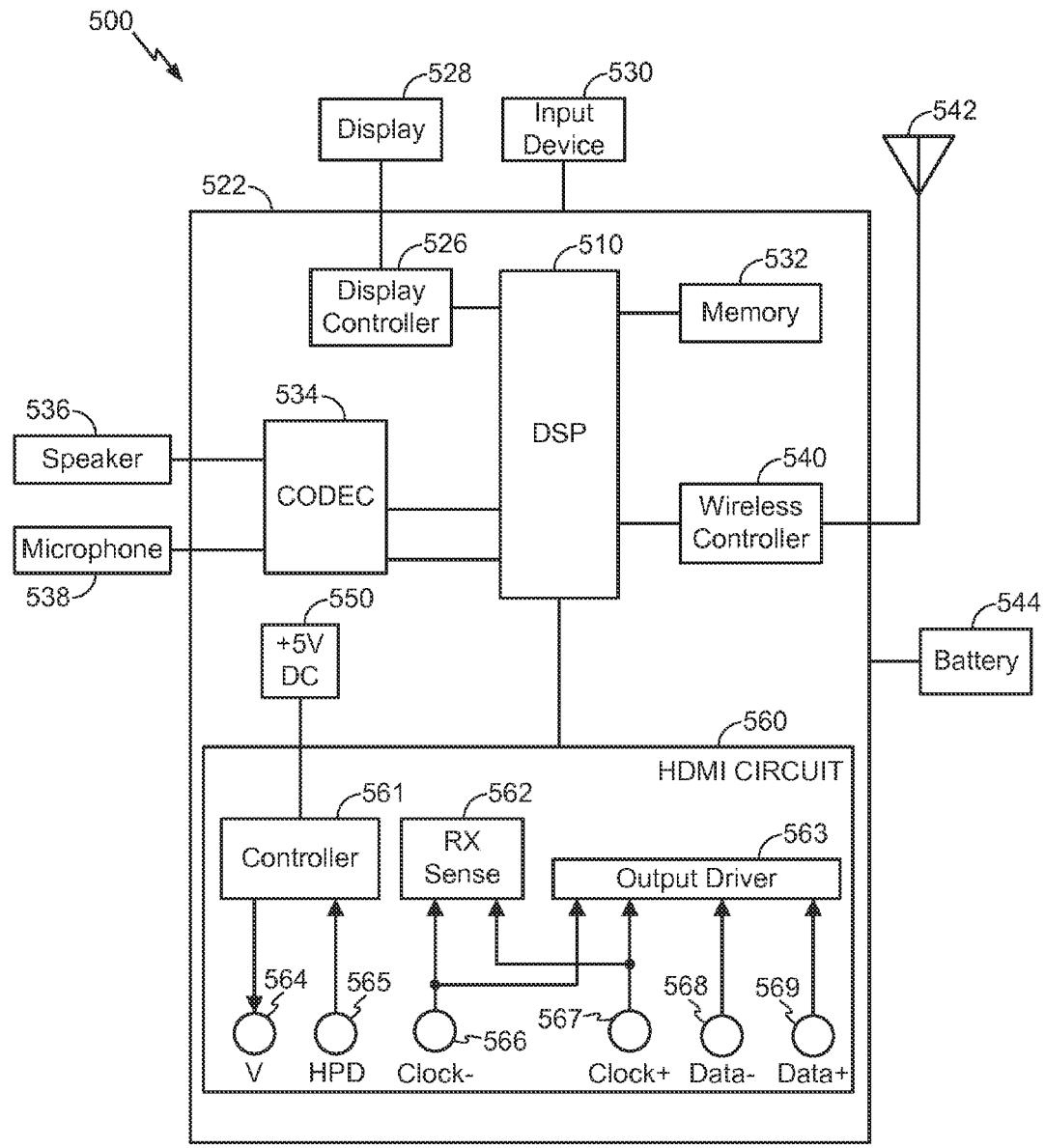
FIG. 5 is a block diagram of a wireless device including power saving for HPD.

Referring to FIG. 5, a block diagram of a particular illustrative embodiment of an electronic device including power saving for HPD is depicted and generally designated 500. The device 500 includes a processor, such as a digital signal processor (DSP) 510, coupled to a memory 532. FIG. 5 also shows a display controller 526 that is coupled to the digital signal processor 510 and to a display 528. A coder/decoder (CODEC) 534 can also be coupled to the digital signal processor 510. A speaker 536 and a microphone 538 can be coupled to the CODEC 534.

The device 500 also includes a +5V DC voltage source 550 and an HDMI circuit 560 coupled to the DSP 510. The HDMI circuit 560 includes a controller 561, an RX sense circuit 562, and an output driver 563. The HDMI circuit 560 includes an HDMI interface comprising a voltage supply pin 564 (e.g., a DC interface), an HPD pin 565, a Clock– pin 566, a Clock+ pin 567, a Data– pin 568, and a Data+ pin 569. In an illustrative embodiment, the +5V DC voltage source 550 is the DC voltage source 112 of FIG. 1, the controller 561 is the controller 114 of FIG. 1, the RX sense circuit 562 is the RX sense circuit 116 of FIG. 1, and the output driver 563 is the output driver 118 of FIG. 1. In a particular embodiment, the HDMI circuit 560 is powered on when the DSP 510 launches an HD application at the device 500 and powered down when the DSP 510 shuts down the HD application at the device 500.

FIG. 5 also indicates that a wireless controller 540 can be coupled to the digital signal processor 510 and to a wireless antenna 542. In a particular embodiment, the DSP 510, the display controller 526, the memory 532, the CODEC 534, the wireless controller 540, the +5V DC voltage source 560 and the HDMI circuit 560 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphone 538, the wireless antenna 542, and the power supply 544 are external to the system-on-chip device 522. However, each of the display 528, the input device 530, the speaker 536, the microphone 538, the wireless antenna 542, and the power supply 544 can be coupled to a component of the system-on-chip device 522, such as an interface or a controller.

Figure 6:
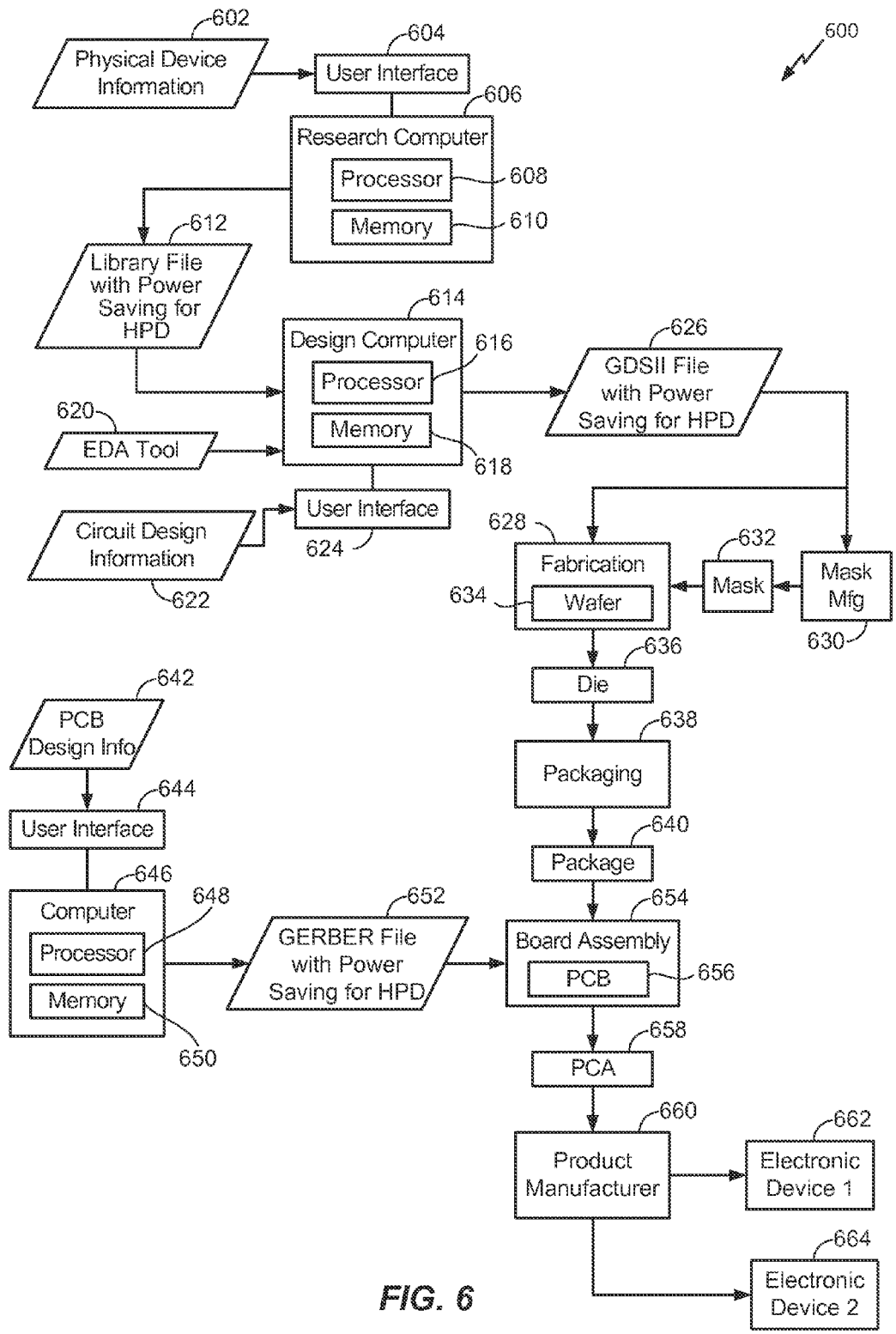
FIG. 6 is a diagram to illustrate a particular embodiment of an electronic device manufacturing process.

FIG. 6 depicts a particular illustrative embodiment of an electronic device manufacturing process 600. For example, the electronic device manufacturing process may be used to manufacture power saving elements for HPD as described herein with reference to FIGS. 1-5 (e.g., components of the system of FIG. 1 or the circuit of FIG. 2) Physical device information 602 is received in the manufacturing process 600, such as at a research computer 606. The physical device information 602 may include design information representing at least one physical property of power saving for HPD, such as elements of power saving for HPD as described herein with reference to FIGS. 1-5. For example, the physical device information 602 may include physical parameters, material characteristics, and structure information that is entered via a user interface 604 coupled to the research computer 606. The research computer 606 includes a processor 608, such as one or more processing cores, coupled to a computer readable medium such as a memory 610. The memory 610 may store computer readable instructions that are executable to cause the processor 608 to transform the physical device information 602 to comply with a file format and to generate a library file 612.

In a particular embodiment, the library file 612 includes at least one data file including the transformed design information. For example, the library file 612 may include a library of semiconductor devices including one or more components of the system of FIG. 1 or the circuit of FIG. 2 that is provided for use with an electronic design automation (EDA) tool 620.

The library file 612 may be used in conjunction with the EDA tool 620 at a design computer 614 including a processor 616, such as one or more processing cores, coupled to a memory 618. The EDA tool 620 may be stored as processor executable instructions at the memory 618 to enable a user of the design computer 614 to design a circuit using one or more components of the system of FIG. 1 or the circuit of FIG. 2, of the library file 612. For example, a user of the design computer 611 may enter circuit design information 622 via a user interface 624 coupled to the design computer 614. The circuit design information 622 may include design information representing at least one physical property of a semiconductor device, such as one or more components of the system of FIG. 1 or the circuit of FIG. 2. To illustrate, the circuit design property may include identification of particular circuits and relationships to other elements in a circuit design, positioning information, feature size information, interconnection information, or other information representing a physical property of a semiconductor device.

The design computer 614 may be configured to transform the design information including the circuit design information 622 to comply with a file format. To illustrate, the file format may include a database binary file format representing planar geometric shapes, text labels, and other information about a circuit layout in a hierarchical format, such as a Graphic Data System (GDSII) file format. The design computer 614 may be configured to generate a data file including the transformed design information, such as a GDSII file 626 that includes information describing one or more components of the system of FIG. 1 or the circuit of FIG. 2 in addition to other circuits or information. To illustrate, the GDSII file 626 may include information corresponding to a system-on-chip (SOC) that includes one or more components of the system of FIG. 1 or the circuit of FIG. 2 and that also includes additional electronic circuits and components within the SOC.

The GDSII file 626 may be received at a fabrication process 628 to manufacture one or more components of the system of FIG. 1 or the circuit of FIG. 2 according to transformed information in the GDSII file 626. For example, a device manufacture process may include providing the GDSII file 626 to a mask manufacturer 630 to create one or more masks, such as masks to be used for photolithography processing, illustrated as a representative mask 632. The mask 632 may be used during the fabrication process to generate one or more wafers 634, which may be tested and separated into dies, such as a representative die 636. The die 636 includes a circuit including one or more components of the system of FIG. 1 or the circuit of FIG. 2.

The die 636 may be provided to a packaging process 638 where the die 636 is incorporated into a representative package 640. For example, the package 640 may include the single die 636 or multiple dies, such as a system-in-package (SiP) arrangement. The package 640 may be configured to conform to one or more standards or specifications, such as Joint Electron Device Engineering Council (JEDEC) standards.

Information regarding the package 640 may be distributed to various product designers, such as via a component library stored at a computer 646. The computer 646 may include a processor 648, such as one or more processing cores, coupled to a memory 650. A printed circuit board (PCB) tool may be stored as processor executable instructions at the memory 650 to process PCB design information 642 received from a user of the computer 646 via a user interface 644. The PCB design information 642 may include physical positioning information of a packaged semiconductor device on a circuit board, the packaged semiconductor device corresponding to the package 640 including one or more components of the system of FIG. 1 or the circuit of FIG. 2.

The computer 646 may be configured to transform the PCB design information 642 to generate a data file, such as a GERBER file 652 with data that includes physical positioning information of a packaged semiconductor device on a circuit board, as well as layout of electrical connections such as traces and vias, where the packaged semiconductor device corresponds to the package 640 including one or more components of the system of FIG. 1 or the circuit of FIG. 2. In other embodiments, the data file generated by the transformed PCB design information may have a format other than a GERBER format.

The GERBER file 652 may be received at a board assembly process 654 and used to create PCBs, such as a representative PCB 656, manufactured in accordance with the design information stored within the GERBER file 652. For example, the GERBER file 652 may be uploaded to one or more machines for performing various steps of a PCB production process. The PCB 656 may be populated with electronic components including the package 640 to form a representative printed circuit assembly (PCA) 658.

The PCA 658 may be received at a product manufacture process 660 and integrated into one or more electronic devices, such as a first representative electronic device 662 and a second representative electronic device 664. As an illustrative, non-limiting example, the first representative electronic device 662, the second representative electronic device 664, or both, may be selected from the group of a set top box, a music player, a video player, an entertainment unit, a navigation device, a communications device, and a computer. As another illustrative, non-limiting example, one or more of the electronic devices 662 and 664 may be remote units such as phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Thus, one or more components of the system of FIG. 1 or the circuit of FIG. 2 may be fabricated, processed, and incorporated into an electronic device, as described in the illustrative process 600. One or more aspects of the embodiments disclosed with respect to FIGS. 1-5 may be included at various processing stages, such as within the library file 612, the GDSII file 626, and the GERBER file 652, as well as stored at the memory 610 of the research computer 606, the memory 618 of the design computer 614, the memory 650 of the computer 646, the memory of one or more other computers or processors (not shown) used at the various stages, such as at the board assembly process 654, and also incorporated into one or more other physical embodiments, such as the mask 632, the die 636, the package 640, the PCA 658, other products such as prototype circuits or devices (not shown), or any combination thereof Although various representative stages of production from a physical device design to a final product are depicted. In other embodiments fewer stages may be used or additional stages may be included. Similarly, the process 600 may be performed by a single entity or by one or more entities performing various stages of the process 600.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An electronic device comprising:
   a direct current (DC) voltage source coupled to a DC interface;
   a receiver sense circuit configured to detect a connection to a sink device via a connector without consumption of power from the DC voltage source; and
   a controller coupled to a hot plug detect (HPD) interface, the controller configured to:
   receive a detection signal from the receiver sense circuit;
   selectively control a switch to enable or disable the DC voltage source based on the detection signal;
   detect an HPD signal at the HPD interface after enabling the DC voltage source; and
   disable the receiver sense circuit in response to detecting the HPD signal.

2. The electronic device of claim 1, wherein the receiver sense circuit is configured to detect the connection based on a signal received from the sink device prior to the controller communicating with the sink device.

3. The electronic device of claim 2, wherein the receiver sense circuit is configured to receive the signal while the DC voltage source is turned off.

4. The electronic device of claim 1, wherein the controller is further configured to detect an absence of the HPD signal and to enable the receiver sense circuit in response to detecting the absence of the HPD signal.

5. The electronic device of claim 1, wherein the DC voltage source is configured to provide a DC voltage of about five volts.

6. The electronic device of claim 1, further comprising an output driver, wherein the controller is further configured to enable data transmission at the output driver in response to detecting the HPD signal.

7. The electronic device of claim 6, wherein the receiver sense circuit and the output driver are each coupled to pins of the connector, and wherein the receiver sense circuit is configured to detect the connection by detecting a signal received via the pins.

8. The electronic device of claim 1, wherein the HPD interface is coupled to an HPD pin of the connector.

9. The electronic device of claim 1, wherein the connector is a high definition multimedia interface (HDMI) connector or a digital visual interface (DVI) connector.

10. The electronic device of claim 1, wherein the sink device comprises a circuit configured to transmit the HPD signal to the controller via the HPD interface in response to receiving a DC voltage from the DC voltage source via the DC interface.

11. The electronic device of claim 1, wherein the controller is a processor within a device selected from a group comprising a music player, a video player, an entertainment unit, a navigation device, a communications device, a personal digital assistant (PDA), a computer, or a combination thereof.

12. An apparatus comprising:
    means for detecting a connection of the apparatus to a sink device via a connector without consumption of power from a DC voltage source within the apparatus;
    means for receiving a detection signal from the means for detecting the connection;
    means for selectively controlling a switch to enable or disable a connection to the DC voltage source;
    means for detecting a presence of a hot-plug detect (HPD) signal at an HPD interface of the apparatus; and
    means for disabling the means for detecting the connection based on the detection of the HPD signal.

13. The apparatus of claim 12, further comprising:
    means for detecting an absence of the HPD signal at the HPD interface; and
    means for enabling the means for detecting the connection when the absence of the HPD signal is detected.

14. The apparatus of claim 12, integrated into at least one semiconductor die.

15. The apparatus of claim 12, further comprising a device selected from a group comprising a music player, a video player, an entertainment unit, a navigation device, a communications device, a personal digital assistant (PDA), a computer, or a combination thereof, into which a semiconductor die is integrated.

16. A method comprising:
receiving design information representing at least one physical property of a semiconductor device, the semiconductor device comprising:
  a direct current (DC) voltage source coupled to a DC interface;
  a receiver sense circuit configured to detect a connection of the semiconductor device to a sink device via a connector without consuming power from the DC voltage source; and
  a controller coupled to a hot plug detect (HPD) interface, the controller configured to:
    receive a detection signal from the receiver sense circuit;
    selectively control a switch to enable or disable the DC voltage source based on the detection signal;
    detect an HPD signal at the HPD interface after enabling the DC voltage source; and
    disable the receiver sense circuit in response to detecting the HPD signal; and
transforming the design information to comply with a file format; and
generating a data file including the transformed design information.

17. The method of claim 16, wherein the data file includes a GDSII format.

18. A method comprising:
receiving a data file comprising design information corresponding to a semiconductor device; and
fabricating the semiconductor device according to the design information, wherein the semiconductor device comprises:
  a direct current (DC) voltage source coupled to a DC interface;
  a receiver sense circuit configured to detect a connection of the semiconductor device to a sink device via a connector without consuming power from the DC voltage source; and
  a controller coupled to a hot plug detect (HPD) interface, the controller configured to:
    receive a detection signal from the receiver sense circuit;
    selectively control a switch to enable or disable the DC voltage source based on the detection signal;
    detect an HPD signal at the HPD interface after enabling the DC voltage source; and
    disable the receiver sense circuit in response to detecting the HPD signal.

19. The method of claim 18, wherein the data file has a GDSII format.

20. A method comprising:
receiving design information comprising physical positioning information of a packaged semiconductor device on a circuit board, the packaged semiconductor device comprising:
  a direct current (DC) voltage source coupled to a DC interface;
  a receiver sense circuit configured to detect a connection of a semiconductor device to a sink device via a connector without consuming power from the DC voltage source; and
  a controller coupled to a hot plug detect (HPD) interface, the controller configured to:
    receive a detection signal from the receiver sense circuit;
    selectively control a switch to enable or disable the DC voltage source based on the detection signal;
    detect an HPD signal at the HPD interface after enabling the DC voltage source; and
    disable the receiver sense circuit in response to detecting the HPD signal; and
transforming the design information to generate a data file.

21. The method of claim 20, wherein the data file has a GERBER format.

22. A method comprising:
receiving a data file comprising design information comprising physical positioning information of a packaged semiconductor device on a circuit board; and
manufacturing the circuit board configured to receive the packaged semiconductor device according to the design information, wherein the packaged semiconductor device comprises:
  a direct current (DC) voltage source coupled to a DC interface;
  a receiver sense circuit configured to detect a connection of a semiconductor device to a sink device via a connector without consuming power from the DC voltage source; and
  a controller coupled to a hot plug detect (HPD) interface, the controller configured to:
    receive a detection signal from the receiver sense circuit;
    selectively control a switch to enable or disable the DC voltage source based on the detection signal;
    detect an HPD signal at the HPD interface after enabling the DC voltage source; and
    disable the receiver sense circuit in response to detecting the HPD signal.

23. The method of claim 22, wherein the data file has a GERBER format.

24. The method of claim 22, further comprising integrating the circuit board into a device selected from a group comprising a music player, a video player, an entertainment unit, a navigation device, a communications device, a personal digital assistant (PDA), a computer, or a combination thereof.

* * * * *